(12) United States Patent
Wang

(10) Patent No.: US 7,482,574 B2
(45) Date of Patent: Jan. 27, 2009

(54) LIGHT GUIDE HAVING AN ELONGATE SHAPE WITH DUAL CONCAVE SHAPED END AND ELECTRONIC DEVICE USING LIGHT GUIDE

(75) Inventor: Dongxue Wang, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 21 days.

(21) Appl. No.: 11/771,008

(22) Filed: Jun. 29, 2007

(65) Prior Publication Data

US 2009/0001250 A1    Jan. 1, 2009

(51) Int. Cl.
*G01J 1/04* (2006.01)

(52) U.S. Cl. .............................. 250/227.11; 250/214 AL

(58) Field of Classification Search ............ 250/227.11, 250/227.14, 227.28, 227.32, 214 AL, 216; 385/12, 14, 39, 49, 115, 119; 359/589, 601, 359/638

See application file for complete search history.

(56) References Cited

U.S. PATENT DOCUMENTS 3,153,172 A * 10/1964 Ling .......................... 315/10
2005/0157911 A1    7/2005 Iseri et al.

OTHER PUBLICATIONS

"I2C Color Light Sensor", ST VM6101, STMicroelectronics, Dec. 2006, 16 pages.

* cited by examiner

*Primary Examiner*—Que T Le
(74) *Attorney, Agent, or Firm*—Sylvia Chen; Paula N. Chavez

(57) ABSTRACT

Disclosed are a light guide (750) and an electronic device including a light guide for coupling ambient light to a light sensor. The light guide (750) that is a structure of light-transmitting material having an elongate shape including a first end (752) for receiving ambient light and a second end (754) for collecting ambient light to transmit to a light sensor. The first end (752) of the light guide has a concave shape and the second end (754) of the light guide also has a concave shape. An electronic device may support the light guide and a light sensor. The concave shape of the second end of the light sensor may disperse light toward the light sensor, rather than tightly focusing the light toward the light sensor. Accordingly, the light sensor may have a sensing area that forms a detection plane so that the detection plane is positioned adjacent to the second end.

20 Claims, 8 Drawing Sheets

LIGHT GUIDE HAVING AN ELONGATE SHAPE WITH DUAL CONCAVE SHAPED END AND ELECTRONIC DEVICE USING LIGHT GUIDE

FIELD

Disclosed are a light guide and an electronic device including a light guide for coupling ambient light to a light sensor.

BACKGROUND

The makers of mobile communication devices, including those of cellular telephones, are increasingly adding features and functionality to their devices. For example, most cellular telephones currently include features that are dependent on or operate as a function of ambient light—features such as still and video cameras, one or more display screens with backlighting, and illuminated keypads.

Meanwhile there is also a trend toward smaller mobile communication devices. As these mobile communication devices become more complicated and smaller, more stringent manufacturing tolerances may be required—possibly making manufacture more expensive. Thus, reducing the need for more stringent manufacturing tolerances may provide a cost benefit to the consumer.

DETAILED DESCRIPTION

Seamless display and imaging by electronic devices may require real-time sensing of ambient light to dynamically adjust, for example, a display and imaging control for features such as liquid crystal display backlighting, keyboard lighting, and camera shutter settings. A key parameter for ambient light sensing may be its robustness to accurately detect the ambient light. Limited available volume or "real estate" of a small electronic device and mechanical constraints make precise alignment of an ambient light sensor relative to a coupling light guide difficult. As a result, ambient light readings made by ambient light sensors may vary significantly across different mobile communication devices because exact placement of the light sensor with respect to a light guide may be required for robustness. Mechanical constraints in terms of allowed tolerances for positioning an ambient light sensor with respect to a light guide may add higher cost to manufacturing—particularly in smaller, more compact devices.

Disclosed are a light guide and an electronic device including a light guide for coupling ambient light to a light sensor. The light guide is a structure of light-transmitting material having an elongate shape including a first end for receiving ambient light and a second end for collecting ambient light to transmit to a light sensor. The first end of the light guide has a concave shape and the second end of the light guide also has a concave shape. An electronic device may support the light guide and a light sensor to sense ambient light. The concave shape of the second end of the light sensor scatters and/or disperses light toward the light sensor, rather than tightly focusing the light toward the light sensor. The light sensor forms a detection plane positioned adjacent to the second end. Accordingly, the mechanical constraint in terms of allowed tolerances of highly focusing the light exiting the second end of the light guide to a light sensor thus may be relaxed and made less stringent. That is, instead of a need to accurately position the light sensor so that it receives highly focused light from the second end of the light guide, light scattered and/or dispersed from the second end of the light guide may be more easily collected.

Less stringent tolerances may be beneficial in manufacturing and for other reasons. Other reasons may include, for example, in the event that the device was damaged, the described configuration may be more tolerant of a shift in the position of either the light guide or the sensor to still maintain its ambient light sensing capability. A less stringent manufacturing tolerance may translate into a lower manufacturing cost that benefits a consumer. Moreover, it may be beneficial to have lower variations between ambient light sensing capabilities from device to device (or model to model) so that illumination calibration may be more reliable or easier to standardize.

Figure 1:
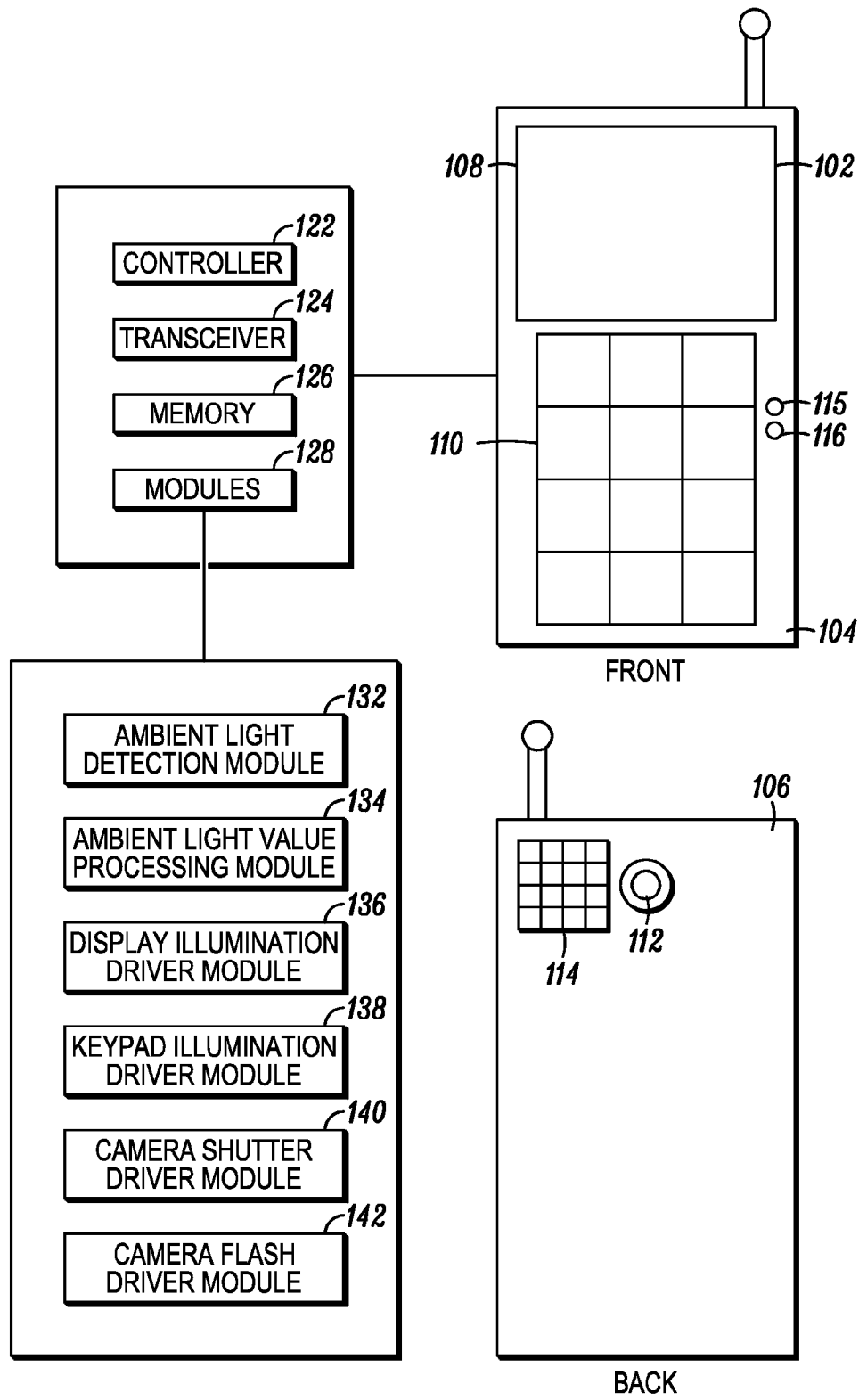
FIG. 1 depicts an electronic device including its front and back in accordance with an embodiment.

FIG. 1 depicts an electronic device 102 having front 104 and back 106. The electronic device 102 includes features and/or functions that depend on or operate as a function of values for sensed ambient light. For example, the electronic device 102 includes features such as a display 108 with a backlight, an illuminated keypad 110, and a still or video camera 112 with an auto-flash 114. Any type of visual indicator 115 may also be dependent upon or operate as a function of values for sensed ambient light. The housing of the electronic device may include an opening 116 configured to let ambient light pass through it to a light guide (for example, see FIG. 2) that is supported by the housing of the device 102. A light sensor (for example, see FIG. 2) for sensing the ambient light as it exits the light guide may be supported within the housing of the device 102.

The described electronic device 102 is implemented as a cellular telephone (also called a mobile phone). It is understood that while a mobile phone is depicted, the described light guide and/or light guide assembly may be utilized in any type of electronic device. The electronic device 102 represents a wide variety of devices that have been developed for use within various settings. Such electronic devices include, for example, cellular telephones, messaging devices, personal digital assistants (PDAs), notebook or laptop computers, mobile data terminals, application specific gaming devices, video gaming devices incorporating wireless modems, digital cameras, remote controllers, and the like.

The electronic device 102 implemented as a mobile communication device may include a controller 122, a transceiver 124, a memory 126, and modules 128. The modules 128 carry out certain processes of the methods as described herein. The modules 128 may include, for example, an ambient light detection module 132, an ambient light value processing module 134, a display illumination driver module 136, a keypad illumination driver module 138, a camera shutter driver module 140, and a camera flash driver module 142. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules 128 will be discussed in more detail below.

Figure 2:
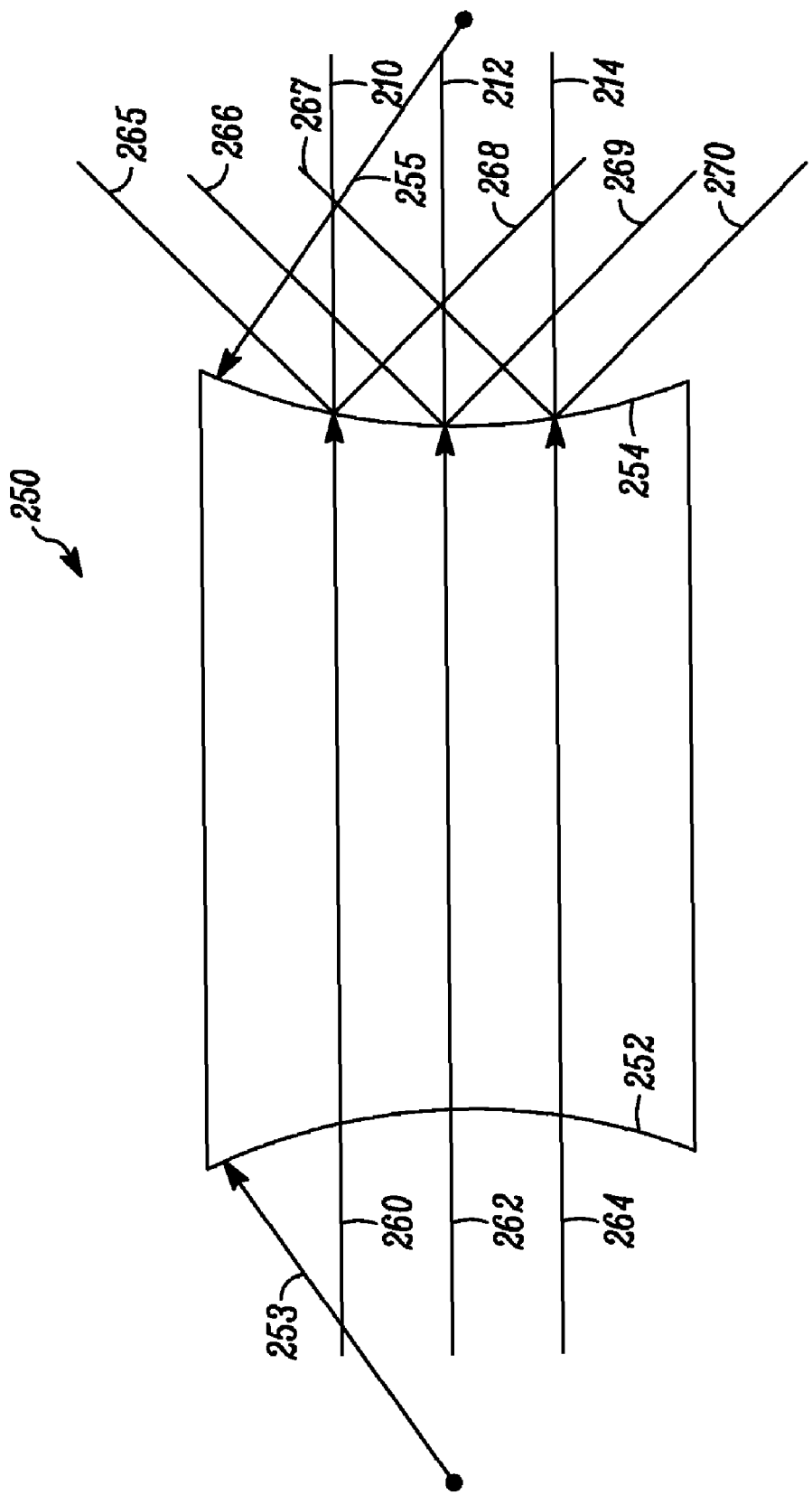
FIG. 2 illustrates an embodiment of the described light guide.
Figure 3:
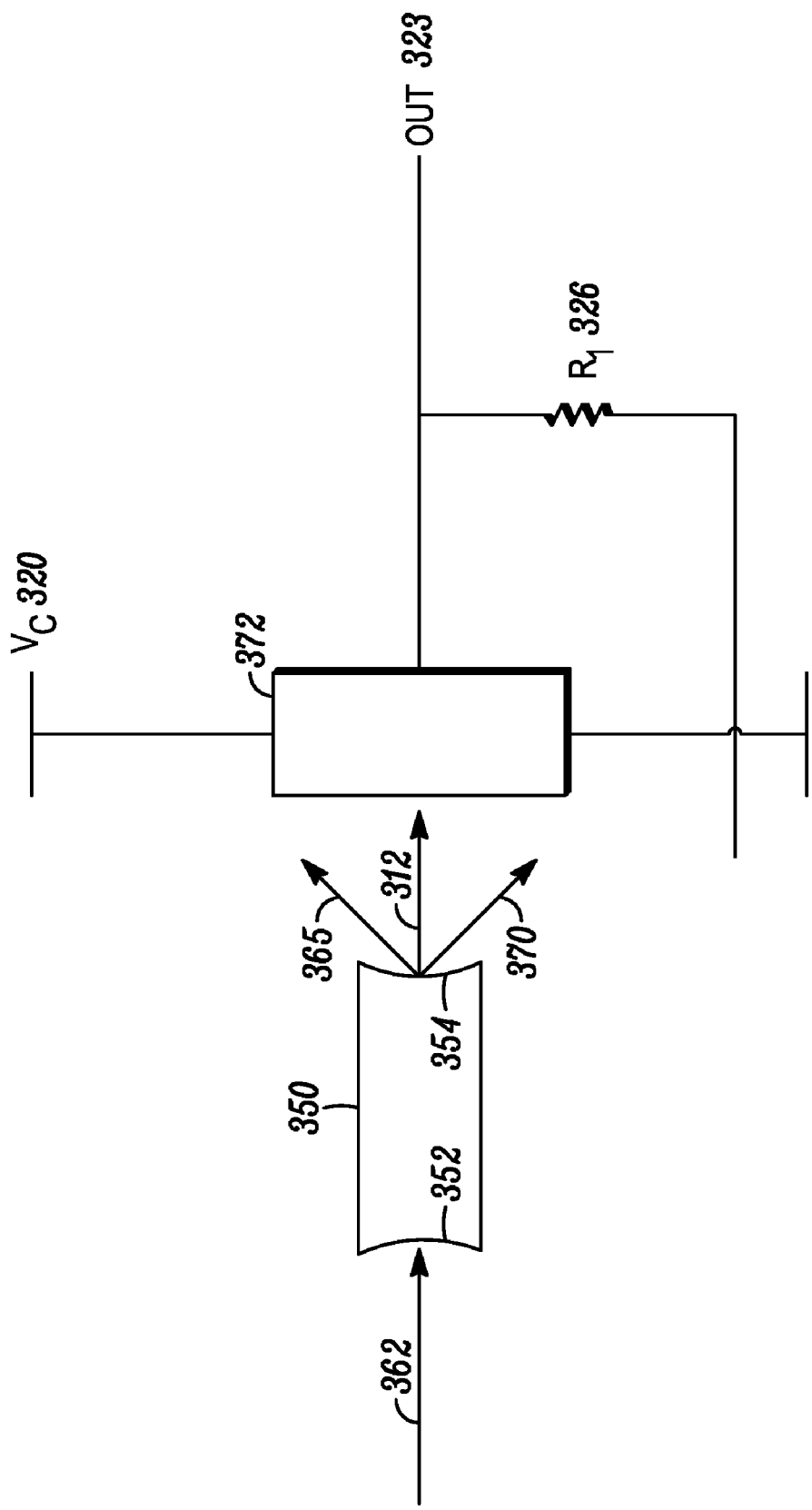
FIG. 3 depicts an embodiment of a light guide adjacent to a light sensor.

FIG. 2 illustrates an embodiment of the described light guide 250 that is a structure of light-transmitting material having an elongate shape including a first end 252 for receiving ambient light and a second end 254 for coupling the received ambient light to a light sensor (see FIG. 3). Ambient light entering the light guide at the first end 252 is depicted by arrows 260, 262 and 264. At the second end 254 of the light guide 250, the ambient light depicted by arrows 210, 212, 214 exits the light guide 250. Since the second end 254 of the light guide is concave, the ambient light also scatters in a plurality of directions, for example, 265, 266, 267, 268, 269 and 270 upon exiting the light guide 250. As the light exiting from the second end 254 is scattered, it may be detected by a light sensor (see FIG. 3). It is understood that while the embodiment shown of the light guide 250 includes a concave second end 254 that causes light to be scattered as it exits the light guide 250, any feature of the second end 254, such as texturing, in combination with a concave shape within the scope of this discussion. Moreover, the elongate shape of the light guide 250 can be any type of elongate shape including a conical shape, or an asymmetrical elongate shape. The first end 252 and the second end 254 of the light guide 250 may of course be of different dimensions. Also, the first end 252 and the second end 254 of the light guide 250 may include the same or different properties, such as polish, coatings such as anti-reflective coating, and texturing. The light guide 250 is constructed from any suitable light-transmitting material, for example, it may be composed of optical plastic.

While FIG. 2 depicts an embodiment of the light guide 250 having a cylindrical elongate shape, as mentioned, the elongate shape may take any elongate form and be of any suitable length, such as 2.1 mm. Additionally, the concave curvature of the first end 252 may have different concave curvature dimensions than the second end 254. For example, in one embodiment, the first end 252 has a radius of curvature 253 of approximately 2.5 mm and the second end 254 has a radius of curvature 255 of 4.5 mm. Also, in one embodiment, the concave shape of the first end 252 defines an open circular aperture of approximately 1.2 mm. Additionally, in the same or another embodiment, the concave shape of the second end 254 defines an open elliptical aperture with a major diameter of approximately 2.4 mm and a minor diameter of approximately 1.2 mm. It is understood that the described dimensions are by way of example, and any suitable light collecting and light scattering dimensions and properties are within the scope of this discussion.

FIG. 3 depicts an embodiment of a light guide 350 adjacent to a light sensor 372. The ambient light 362 enters the light guide 350 at its first end 352 and exits the light guide at second end 354. Ambient light is scattered by the light guide 350 as it exits the second end 354 as illustrated by arrows 365, 312, and 370. A light sensor 372 is depicted to receive the ambient light exiting the light guide 350. To receive the scattered and/or dispersed ambient light, the light sensor 372 has a sensing area that forms a detection plane, which is positioned adjacent to the second end 354. So that the light sensor 372 may capture a substantial amount of the scattered light from the second end 354, the light sensor 372 may be positioned relatively close to the second end 354 of the light guide 350. That is, the ambient light detected by the light sensor 372 has been scattered by the second end 354 of the light guide 350 to be received across the light sensor 372. In one embodiment the detection plane of the light sensor 372 is 220 microns by 240 microns. The light or luminance sensor may be, for example, a photodiode or a current amp IC which may be less than 2 mm by 1.5 mm.

The ambient light detected by the light sensor 372 may create a voltage $V_C$ 320. The circuit or ambient light detection module 132 (see FIG. 1) may utilize a resistor $R_L$ 326 coupled to the output "Out" 323 of the light sensor 372. The light detection sensitivity may be adjusted by the sensing resistor $R_L$ 326. The output of the light sensor 372 may have a current value that may be processed by the controller 122 (see FIG. 1), for example by an ambient light value processing module 134 of the electronic device 102 so that it generates a signal responsive to the ambient light value that can be used to adjust illumination of any type of illumination device of the electronic device. That is, the signal generated by the controller 122 as a result of the output "Out" 323 of FIG. 3 may be processed to drive illumination for any element of electronic device that is dependent and/or operates as a function of ambient light. Alternately or additionally, it can be used to determine a shutter speed or aperture of a camera.

The output "Out" 323 may be processed to drive any illuminating device configured so that its brightness is adjustable based on a signal received via the light sensor 372. For example, the output "Out" 323 could be utilized by the display illumination driver module 136 (see FIG. 1), where the light sensor 372 is configured to provide a signal for control of a backlight of the display 108. In the same or another embodiment, the output "Out" 323 may be utilized by the keypad illumination driver module 138. The keypad 110 may be configured to brighten or dim based on a signal received via the light sensor 372. In the same or yet another embodiment, the output "Out" 323 may be utilized by the camera shutter driver module 140 where a camera 112 having a shutter may be configured so that the shutter speed is adjustable based on a signal received from the light sensor 372. In the same or still another embodiment, the output "Out" 323 may be utilized by the camera flash driver module 142 of a camera auto-flash 114 configured to turn on or off a flash and/or adjust its brightness based on a signal received from the light sensor 372.

Figure 4:
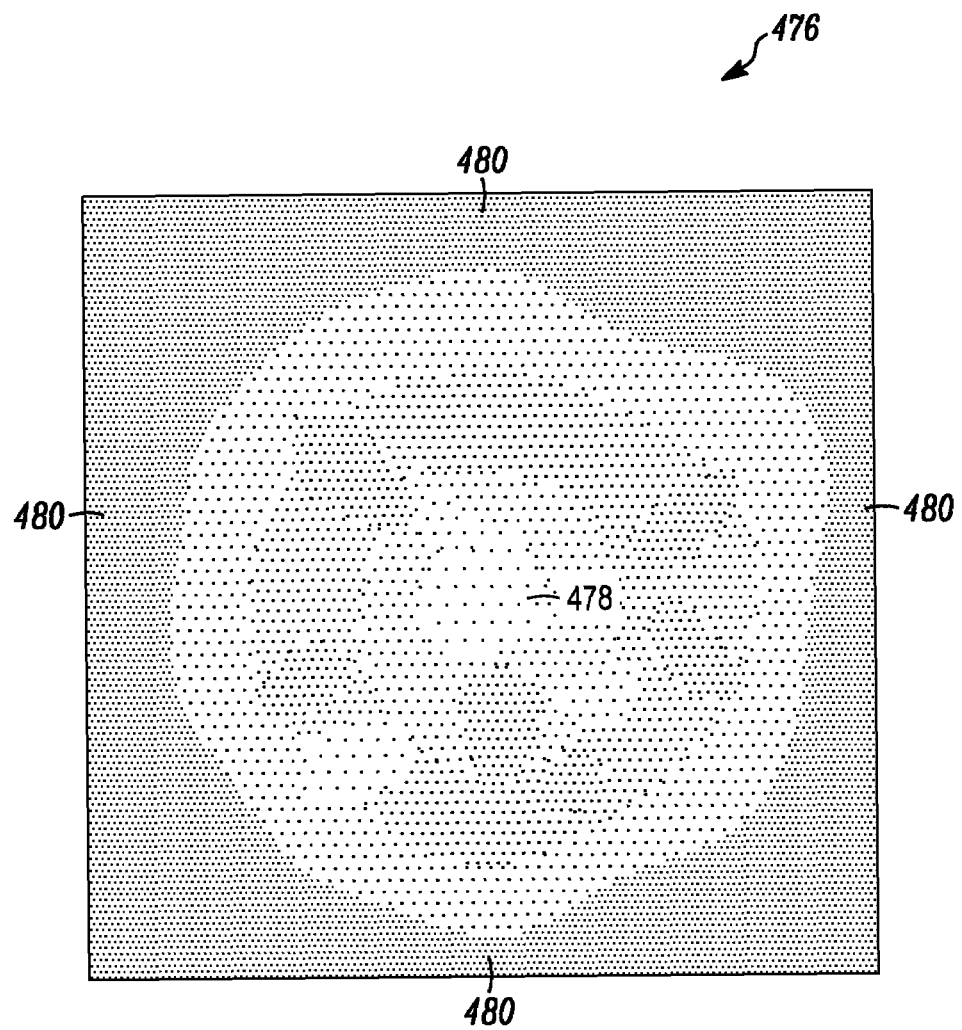
FIG. 4 depicts an output of the light guide as it may be detected across a light sensor in accordance with an embodiment.

FIG. 4 depicts detected light output pattern 476 of the light guide 350 (see FIG. 3) as it may be detected across a light sensor 372. Instead of being concentrated in a "hot spot," the described detected output pattern 476 falls off from the center 478 to the edges 480 of the light sensor 372. A substantial amount of the ambient light may be captured by the light sensor 372 depending upon the size of the light sensor detecting surface with respect to the spread of the light from the light scattering surface of the second end 354 of the light guide 350. The light output may be approximately uniform over the operative area of the detector. Therefore, the necessity of exact positioning and maintaining the position of the light sensor with respect to the light guide may be less critical in accordance with the disclosed assembly. In this way, there may be a lower cost associated with manufacturing as a result of less stringent tolerance requirements. For example, in the event that the device was damaged, the described configuration may be more tolerant of a shift in the position of either the light guide or the sensor to still maintain its ambient light sensing capability. A less stringent manufacturing tolerance may translate into a lower manufacturing cost that may be a benefit to the consumer.

Figure 5:
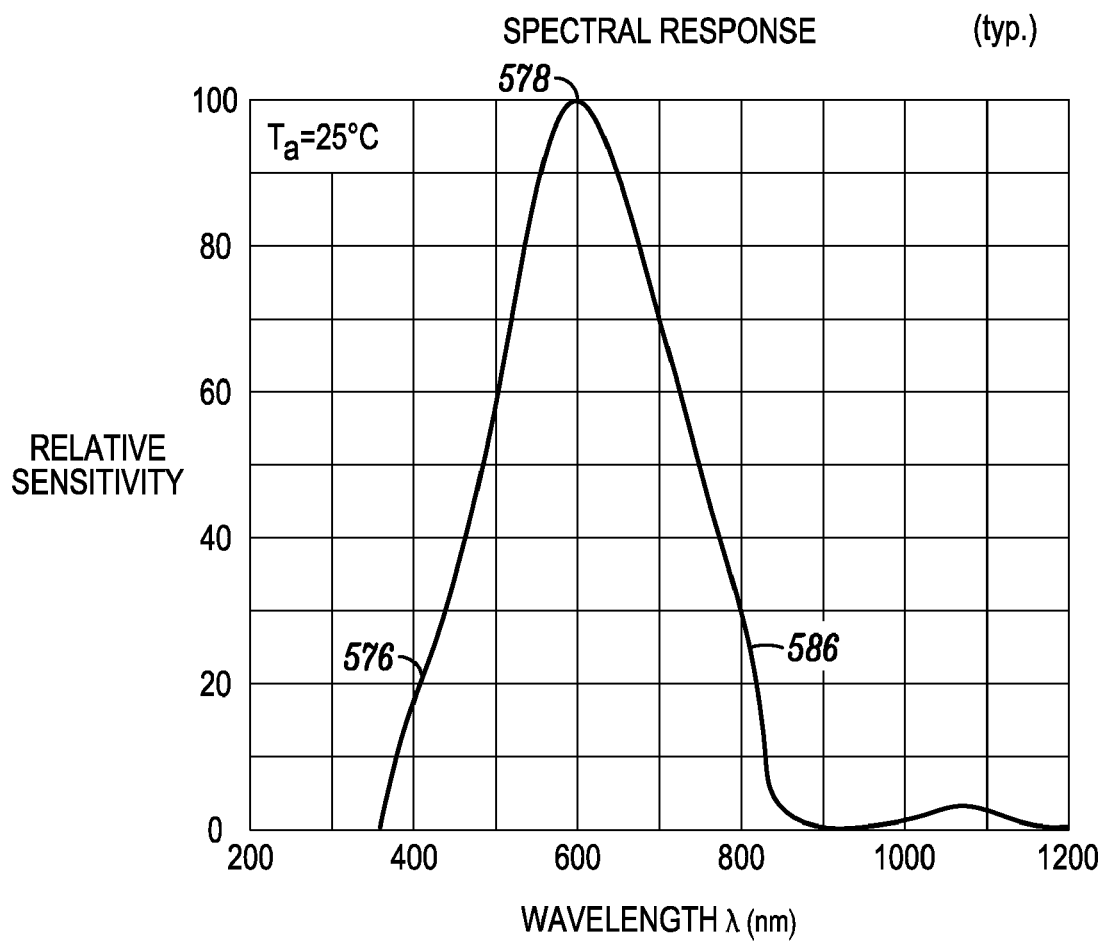
FIG. 5 is a graph that illustrates the spectral response of an embodiment of the described assembly while detecting ambient light.

FIG. 5 is a graph that illustrates the spectral response of one embodiment of the described assembly while detecting ambient light. While there may not be a hot spot on the light sensor 372 (see FIGS. 3-4), there may be higher sensitivity 578 at a particular wavelength, in this embodiment, 600 nm. The sensitivity 576 and 586 may fall off on either side of 600 nm, for example at 400 nm and 800 nm. The properties of the detected ambient light and the light sensor 372 help determine the spectral response.

Figure 6:
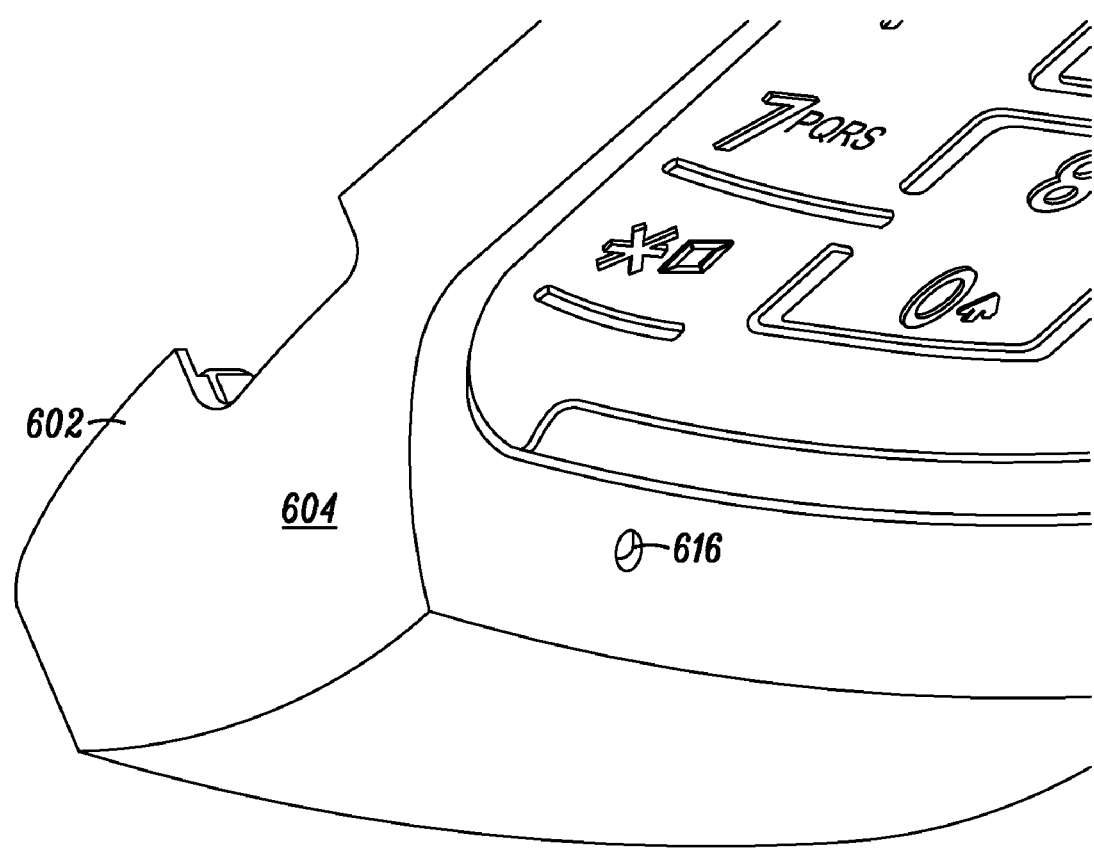
FIG. 6 depicts a portion of a housing of an electronic device including an opening in accordance with an embodiment.

FIG. 6 depicts a portion of a housing 604 of an electronic device 602 including an opening 616. The opening 616 is configured to let ambient light pass to the coupling light guide 250 (see FIG. 2) and then to a light sensor 372 (see FIG. 3) supported within the housing 604. FIG. 1 illustrates an alternate position for an opening 116 (see FIG. 1). The housing 604 at the opening 616 may have a curvature that is flush with the curvature of the concave first end 252 of the light guide 250. It is understood that the opening 616 and light guide and sensor assembly may be in any suitable arrangement. When assembled, the first end 252 of the light guide 250 is inserted into the opening 616. Because the curvature of the first end 252 matches the curvature of the external side of the housing, the light guide 250 is unobtrusive to the user of the electronic device.

Figure 7:
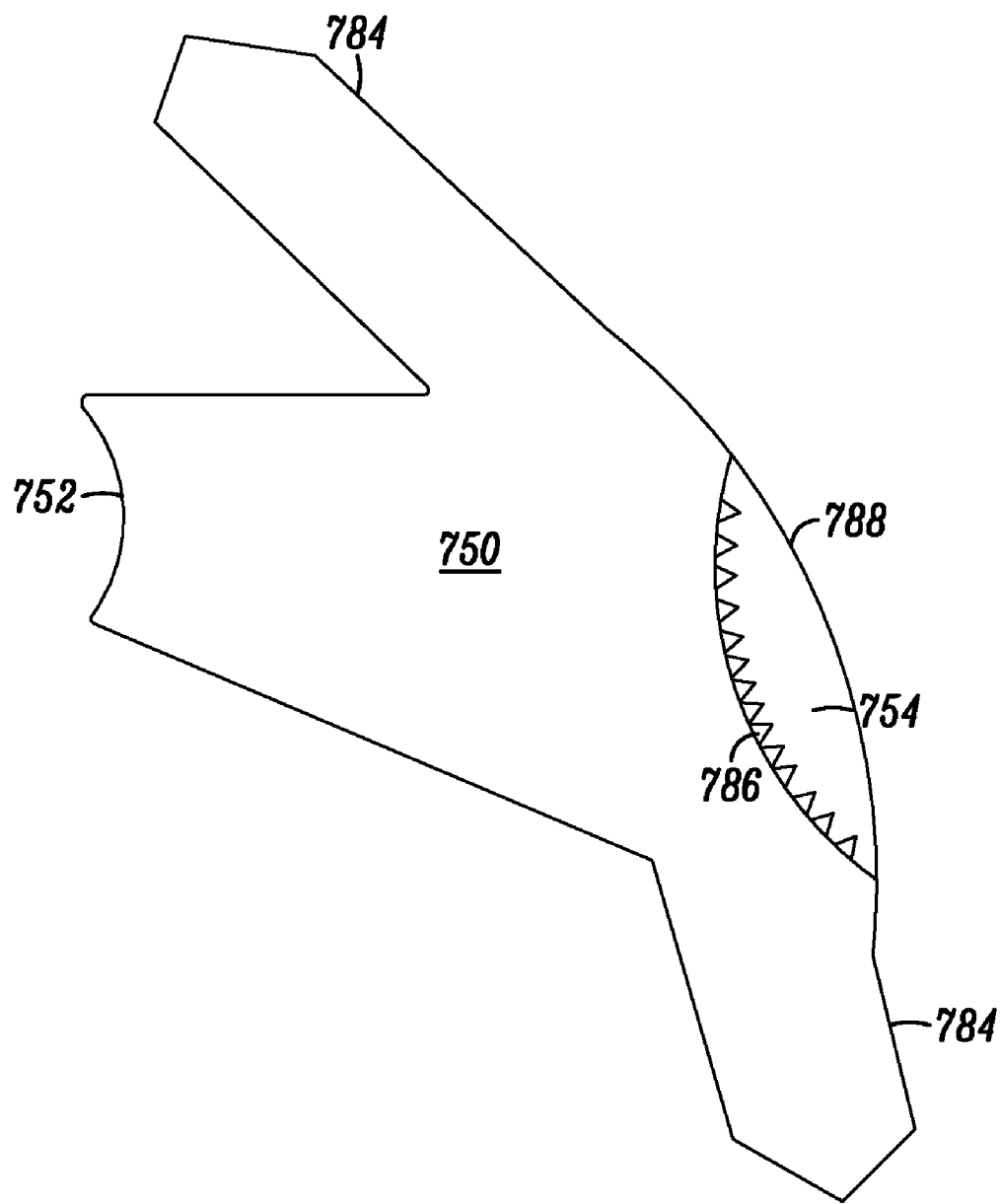
FIG. 7 is an embodiment of a light guide that is a structure having an elongate shape that includes a flange.

FIG. 7 is an embodiment of a light guide 750 that is a structure of a light-transmitting material having an elongate shape including a first end 752 for receiving the ambient light and a flange 784 adjacent the second end 754. The flange 784 may be configured to be adhered to the inner surface (see FIG. 8) of the housing 104 (see FIG. 1), and to support the second end 754 of the light guide 750. An adhesive (not shown) may be positioned on a portion of the flange 784 and enable the light guide 750 to be affixed to the inner surface 890 of the housing 604 (shown in FIG. 6 and FIG. 8). FIG. 7 further illustrates a textured surface 786 that helps scatter light across the light sensor 372 (see FIG. 3). It is understood that any type of suitable texturing is within the scope of this discussion as are any other properties that the second end 754 may possess to help scatter light, including but not limited to the concave shape of the second end 754.

Figure 8:
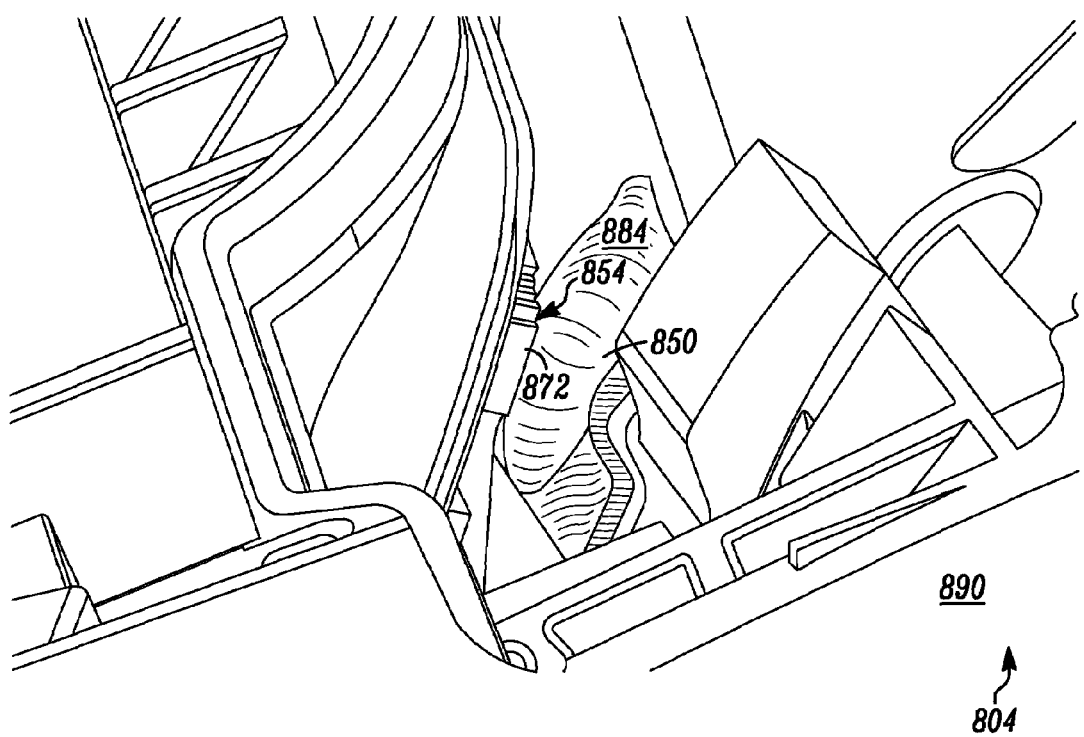
FIG. 8 illustrates an inner surface of the housing including a light guide and a sensor in accordance with an embodiment.

FIG. 8 illustrates an inner surface 890 of the housing 804 including a light guide 850 and a light sensor 872. The housing 804 is a different view of housing 604 (FIG. 6), and the housing 804 is oriented so that viewer is "inside" the housing 804 and the light guide 850 is installed in the opening 616 (shown in FIG. 6). As mentioned above, the light guide 850 may include a flange 884 adjacent the second end 854. The flange 884 may be configured to be adhered to the inner surface 890 of the housing 804 and to support the second end 854. Also shown is a light sensor 872 that has a sensing area that forms a detection plane, the detection plane positioned adjacent to the second end 854. The described light guide 850 and light sensor 872 may provide a high coupling efficiency as well as a high uniform light output "Out" (see FIG. 3). It is understood that any suitable assembly and/or arrangement where ambient light scattered by a coupling light guide that can be detected across a light sensor is within the scope of this discussion.

The disclosed light guide and electronic device including a light guide that is a structure of light-transmitting material having an elongate shape including a first end for receiving ambient light and a second end for coupling ambient light to a light sensor where the first end of the light guide has a concave shape and the second end of the light guide has a concave shape, may robustly and accurately detect ambient light. Limited available volume or "real estate" of a small electronic device and mechanical constraints make precise alignment of its ambient light sensor difficult. Instead of a need to accurately position the light sensor so that it receives highly focused light from the second end of a coupling light guide, light dispersed from the second end of the light guide may be more easily collected and therefore, larger alignment tolerances of the disclosed light guide and/or assembly may be beneficial in manufacturing and for other reasons. In this way, the light intensity may be controlled within a tolerance zone of the light sensor positioning.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, rotating and stationary, and the like are used solely to distinguish one from another entity or action without necessarily requiring or implying any actual such relationship or order between such entities or actions.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A light guide comprising:
   a structure of light-transmitting material having an elongate shape;
   the elongate shape including a first end for receiving ambient light and a second end for coupling ambient light to a light sensor;
   the first end having a concave shape; and
   the second end having a concave shape.

2. The light guide of claim 1 wherein the concave shape of the first end has a radius of curvature of approximately 2.5 mm.

3. The light guide of claim 1 wherein the concave shape of the first end defines an open circular aperture with a diameter of approximately 1.2 mm.

4. The light guide of claim 1 wherein the concave shape of the second end has a radius of curvature of approximately 4.5 mm.

5. The light guide of claim 1 wherein the concave shape of the second end defines an open elliptical aperture with a major diameter of approximately 2.4 mm and a minor diameter of approximately 1.2 mm.

6. The light guide of claim 1 wherein:
   the first end of the light guide is polished; and
   the first end of the light guide is coated with an anti-reflective coating.

7. The light guide of claim 1 wherein the elongate shape has a length of approximately 2.1 mm.

8. The light guide of claim 1, further comprising:
a flange adjacent the second end, the flange configured to support the second end.

9. The light guide of claim 8, further comprising:
an adhesive affixed to the flange.

10. An electronic device, comprising:
a light sensor;
a light guide of a light-transmitting material having an elongate shape, the elongate shape of the light guide including a first end for receiving ambient light and a second end for coupling ambient light to the light sensor, the first end having a concave shape, the second end having a concave shape adjacent to the light sensor; and
an illuminating device configured so that its brightness is adjustable based on a signal from the light sensor.

11. The electronic device of claim 10, wherein the elongate shape of the light guide includes a fan-out shape from the first end to the second end.

12. The electronic device of claim 10 wherein:
the first end of the light guide is polished; and
the first end of the light guide is coated with an anti-reflective coating.

13. The electronic device of claim 10 wherein the second end of the light guide is textured to scatter light.

14. The electronic device of claim 10, wherein the light sensor has a sensing area that forms a detection plane, the detection plane positioned adjacent to the second end.

15. An electronic device, comprising:
a housing with an opening configured to let ambient light pass through;
a light sensor supported within the housing;
a light guide of a light-transmitting material having an elongate shape, the elongate shape including a first end for receiving the ambient light and a second end for coupling the ambient light to the light sensor, the first end having a concave shape and adjacent to the opening, and the second end having a concave shape and adjacent to the light sensor.

16. The electronic device of claim 15, wherein:
the housing comprises an inner surface;
the light guide further has a flange adjacent the second end; and
the flange is configured to be adhered to the inner surface of the housing, and to support the second end.

17. The electronic device of claim 15, further comprising:
an illuminating device configured so that its brightness is adjustable based on a signal received from the light sensor;
wherein:
the illuminating device is selected from a group consisting of a display, a keypad, an indicator, and a camera flash.

18. The electronic device of claim 15 further comprising:
a camera having a shutter configured so that a shutter speed is adjustable based on a signal received from the light sensor.

19. The electronic device of claim 15 further comprising:
a camera auto-flash configured to turn on a flash based on a signal received from the light sensor.

20. The electronic device of claim 15, further comprising:
a display having a backlight;
wherein the light sensor is configured to provide a signal for control of the backlight of the display.

* * * * *